US011565214B1

United States Patent
Magee (10) Patent No.: US 11,565,214 B1
(45) Date of Patent: Jan. 31, 2023

(54) OSMOTIC SYSTEM AND METHOD FOR FOOD AND OXYGEN PRODUCTION

(71) Applicant: Florida A&M University, Tallahassee, FL (US)

(72) Inventor: Charles Magee, Cairo, GA (US)

(73) Assignee: Florida A&M University, Tallahassee, FL (US)

( * ) Notice: Subject to any disclaimer, the term of this patent is extended or adjusted under 35 U.S.C. 154(b) by 665 days.

(21) Appl. No.: 16/739,989

(22) Filed: Jan. 10, 2020

Related U.S. Application Data (60) Provisional application No. 62/790,730, filed on Jan. 10, 2019.

(51) Int. Cl.

| | | |
|---|---|---|
| A01G 9/24 | (2006.01) | |
| B01D 61/00 | (2006.01) | |
| B01D 61/08 | (2006.01) | |
| C02F 103/00 | (2006.01) | |
| C02F 103/08 | (2006.01) | |
| B01D 61/58 | (2006.01) | |
| C02F 1/00 | (2006.01) | |
| C02F 1/44 | (2006.01) | |

(52) U.S. Cl.
CPC ........... B01D 61/002 (2013.01); A01G 9/246 (2013.01); A01G 9/247 (2013.01); A01G 9/249 (2019.05); B01D 61/08 (2013.01); B01D 61/58 (2013.01); C02F 1/001 (2013.01); C02F 1/441 (2013.01); C02F 1/445 (2013.01); B01D 2311/2673 (2013.01); C02F 2103/005 (2013.01); C02F 2103/08 (2013.01)

(58) Field of Classification Search
CPC ........ B01D 61/002; C02F 1/441; C02F 1/445; A01G 9/246; A01G 9/247
See application file for complete search history.

(56) References Cited

U.S. PATENT DOCUMENTS

| | | | |
|---|---|---|---|
| 2008/0102119 A1* | 5/2008 | Grovender | ........ A61M 5/14593 604/890.1 |
| 2019/0104688 A1* | 4/2019 | Abeles | ................... A01G 27/00 |

FOREIGN PATENT DOCUMENTS

| | | | | |
|---|---|---|---|---|
| CN | 109076829 A | * | 12/2018 | |
| WO | WO-2009128320 A1 | * | 10/2009 | ............. A01G 9/246 |

OTHER PUBLICATIONS

WO-2009128320-A1 translation—Hagiwara Y—Oct. 2009 (Year: 2009).*
CN-109076829-A translation—Duan L—Dec. 2018 (Year: 2018).*

* cited by examiner

Primary Examiner — Bradley R Spies
(74) Attorney, Agent, or Firm — Michele L. Lawson; Smith & Hopen, P.A.

(57) ABSTRACT

An osmotic food production system designed to produce fruits, vegetables, and freshwater from urine or saltwater. In some embodiments the osmotic food production system also produces oxygen. In some embodiments, the osmotic food production system is portable and capable of transporting on a vehicle capable of space travel. Embodiments of the present invention can be used to address the existing problems of food production, waste disposal/utilization, oxygen generation, and water conservation in an efficient way to allow for prolonged space travel or colonization of distant planets and moons.

20 Claims, 5 Drawing Sheets

OSMOTIC SYSTEM AND METHOD FOR FOOD AND OXYGEN PRODUCTION

CROSS-REFERENCE TO RELATED APPLICATIONS

This application is a nonprovisional of and claims priority to Provisional Application No. 62/790,730, entitled "An Osmotic System and Method For Food and Oxygen Production," filed Jan. 10, 2019 by the same inventor, the entirety of which is incorporated by reference.

BACKGROUND OF THE INVENTION

1. Field of the Invention

This invention relates, generally, to food and oxygen production and waste disposal/utilization. More specifically, embodiments of the disclosure relate to an osmotic system for food and oxygen production.

2. Brief Description of the Prior Art

It is well known that as humans continue space exploration over vast distances and longer periods of time and space, the problems of food production, waste disposal/utilization, oxygen generation, and water conservation must be resolved. At the present time, no vehicle capable of space travel is able to carry enough food, water, and oxygen to supply a space crew for months or years of space travel or colonization of a distant planet or moon. Therefore, an in-vehicle and on-planet food production; waste utilization, and oxygen generation system is needed to advance space exploration further.

While certain aspects of conventional technologies have been discussed to facilitate disclosure of the instant application, Applicants in no way disclaim these technical aspects, and it is contemplated that the instant application may encompass one or more of the conventional technical aspects discussed herein.

The present disclosure may address one or more of the problems and deficiencies in the art discussed above. However, it is contemplated that this disclosure may prove useful in addressing other problems and deficiencies in many technical areas. Therefore, the present application should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The novel system includes an osmotic device for food and oxygen production. The osmotic device comprises a body having an external surface and an internal surface defining a growth chamber disposed to receive one or more agricultural plants therein. The external surface includes a first reservoir containing a first fluid and a second reservoir containing a second fluid. When in a low gravity environment, such as during space travel on the on-planet settings, each of the first and the second reservoirs are pressurized. The first fluid has a lower concentration than the second fluid may be either urine and/or saltwater.

An air conditioning unit coupled to the external surface and is in fluidic communication with the growth chamber conditioning the air within the growth chamber to a predetermined temperature and humidity. Further, the external surface includes an air compressor in fluidic communication with the growth chamber, such that the air compressor pumps gas into the growth chamber pressurizing the growth chamber to a predetermined pressure typically atmospheric pressure.

An osmotic wall abuts at least a portion of the internal surface of the osmotic device. The osmotic wall includes a first partition, a second partition, and a third partition. The second partition resides between the first and the third partitions. The first and the third partitions are configured to receive the first fluid, and the second partition is configured to receive the second fluid.

Disposed between the first partition and the second partition, a first semi-permeable membrane is configured to permit the first fluid flowing within the first partition to diffuse through the first semi-permeable membrane and into the second fluid flowing within the second partition, thereby increasing the pressure of the first fluid within the third partition.

Next, a non-permeable membrane is disposed between the second partition and the third partition to prevent either of the first fluid or the second fluids from being diffused through the non-permeable membrane.

A second semi-permeable membrane is disposed between the third partition and the growth chamber and configured to permit the diffusion of at least a portion of the first fluid through the semi-permeable membrane. A portion of the first fluid is deposited on a surface of the second semi-permeable membrane. The air conditioning unit then circulates dry air within the growth chamber, evaporating the portion of the first fluid deposited on the surface of the second semi-permeable membrane into the environment within the chamber.

A condenser is in fluidic communication with the environment within the growth chamber and converts water vapor within the environment to liquid water. The liquid water is then deposited into a nutrient tank and configured to supply nutrient-rich water to one or more agricultural plants.

In an embodiment, the osmotic device includes one or more ultra-violet lights disposed within the growth chamber to promote photosynthesis. In yet another embodiment, the osmotic device further comprises one or more PAR lights configured to emit photosynthetic active radiation, such that the PAR lights promote photosynthesis.

In an embodiment, the osmotic device includes a mobile growing device removably received within the growth chamber. The mobile growing device comprises a frame for supporting one or more troughs arranged in a cascading pattern. Each trough is capable of growing one or more agricultural plants therein. A plurality of wheels is coupled to a first end of the frame and permits the movement of the frame in a first direction. A nutrient tank is coupled to or resides upon a portion of the frame. The nutrient tank includes a pump to circulate the nutrient-rich water from the nutrient tank to the one or more troughs secured to the frame. The nutrient-rich water then cascades down the troughs and the excess nutrient-rich water is re-deposited within the nutrient tank. In an embodiment, the nutrient tank may include aquatic life to increase the nutritional benefit of the nutrient-rich water. In an embodiment, a magnetic dome resides above at least one of the one or more agricultural plants and protects the agricultural plants from cosmic radiation when the mobile growing device is secured within the growth chamber.

In an embodiment, a first set of bar magnets is disposed along the second semi-permeable membrane and a second set of bar magnets is disposed along the non-permeable membrane. Each of the bar magnets of the first and the second set of bar magnets are disposed in parallel relation, wherein like poles of the first set of bar magnets and the like poles of the second set of bar magnets are oriented towards one another. In this relationship repelling forces between like poles prevent the third partition from collapsing in on itself under pressure from the first and the second partitions.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION in the following detailed description of the preferred embodiments, reference is made to the accompanying drawings, which form a part thereof and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes an osmotic food production system that makes it possible to produce food in space vehicles and other planets under conditions similar to those on Earth. The controlled environment within the growth chamber can be adjusted to optimal conditions for each type of plant; several types of vegetable can be grown in the system at the same time; magnetic dome will protect the plants from cosmic radiation; seeds can be germinated in the osmotic chamber; osmotic chamber can be used to compost plant and food waste; system makes organic production of fruits, vegetables, and fish possible without a greenhouse or specialized facility; a single system for fruits, vegetables, and fish production, and seeds germination; the system can be used to convert urine to freshwater; system is portable; system is low cost, easy to sanitize, reusable, and easy to manufacture; system parts and components are replaceable; system can be assembled or disassembled by a single person; easier to control insects and pests.

Figure 1:
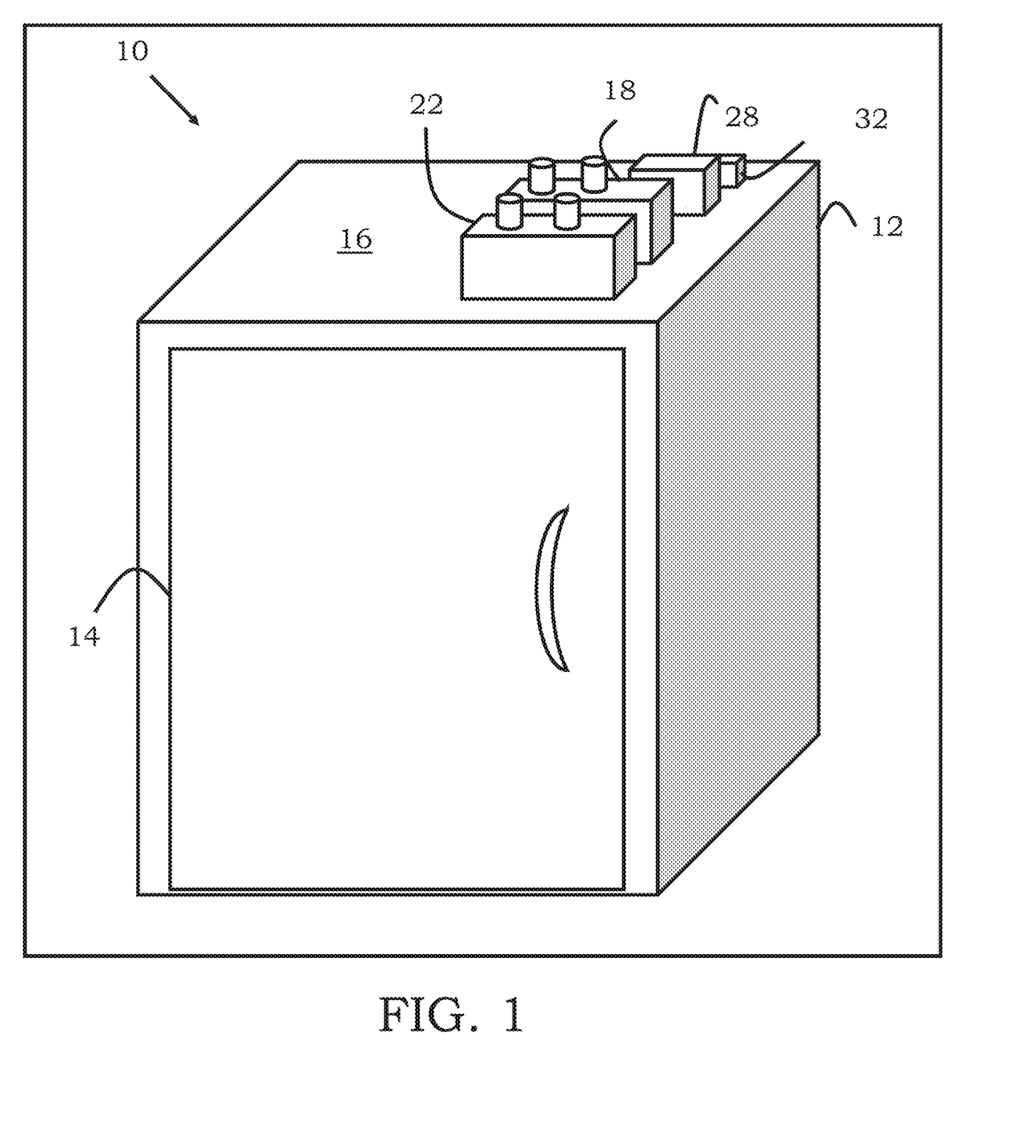
FIG. 1 is a perspective view of an osmotic growth chamber, in accordance with an embodiment of the present invention.

As shown in FIG. 1, osmotic food production device 10 (hereinafter osmotic device 10) includes body 12 and door 14 that is coupled to body 12. Body 12 includes external surface 16 having first reservoir 22 containing first fluid 24 and second reservoir 18 containing second fluid 20 coupled to external surface 16. When in a low or no gravity environment, each of the first 22 and second 18 reservoirs are pressurized with gas to force first fluid 24 into first partition 26A and third partition 26C and second fluid 20 into second partition 26B. The gas may be air, carbon dioxide, or a similar gas. For example, when in use on the surface of Mars, the gas is carbon dioxide as it is readily available on the Martian surface. First fluid 24 has a lower concentration than the second fluid 20. In an embodiment, first fluid 24 is low concentration urine and second fluid 20 is high concentration urine. The fluid with low concentration of solutes will promote osmosis. In yet a further embodiment, second fluid 20 is highly concentrated salt water, while first fluid 24 has a salt content lower than that of the second fluid 20.

When human urine is the source of freshwater, the process begins by freezing and thawing of the urine several times. As a solution is frozen the solutes in the remaining unfrozen liquid will become more concentrated. This highly concentrated urine can be drained into second reservoir 18 and when the frozen solution melts, it will be stored in first reservoir 22.

External surface 16 further includes air conditioning unit 28 in fluid communication with growth chamber 30. Air conditioning unit 28 conditions the air within growth chamber 30 to a predetermined temperature and humidity based on the agricultural plants being grown within growth chamber 30. For example, the climate within growth chamber 30 can range from temperate to tropical. Air compressor 32 is also in fluidic communication with growth chamber 30 and pumps gas into growth chamber 30 to pressurize growth chamber 30 to an appropriate plant growth pressure typically atmospheric pressure.

Figure 2:
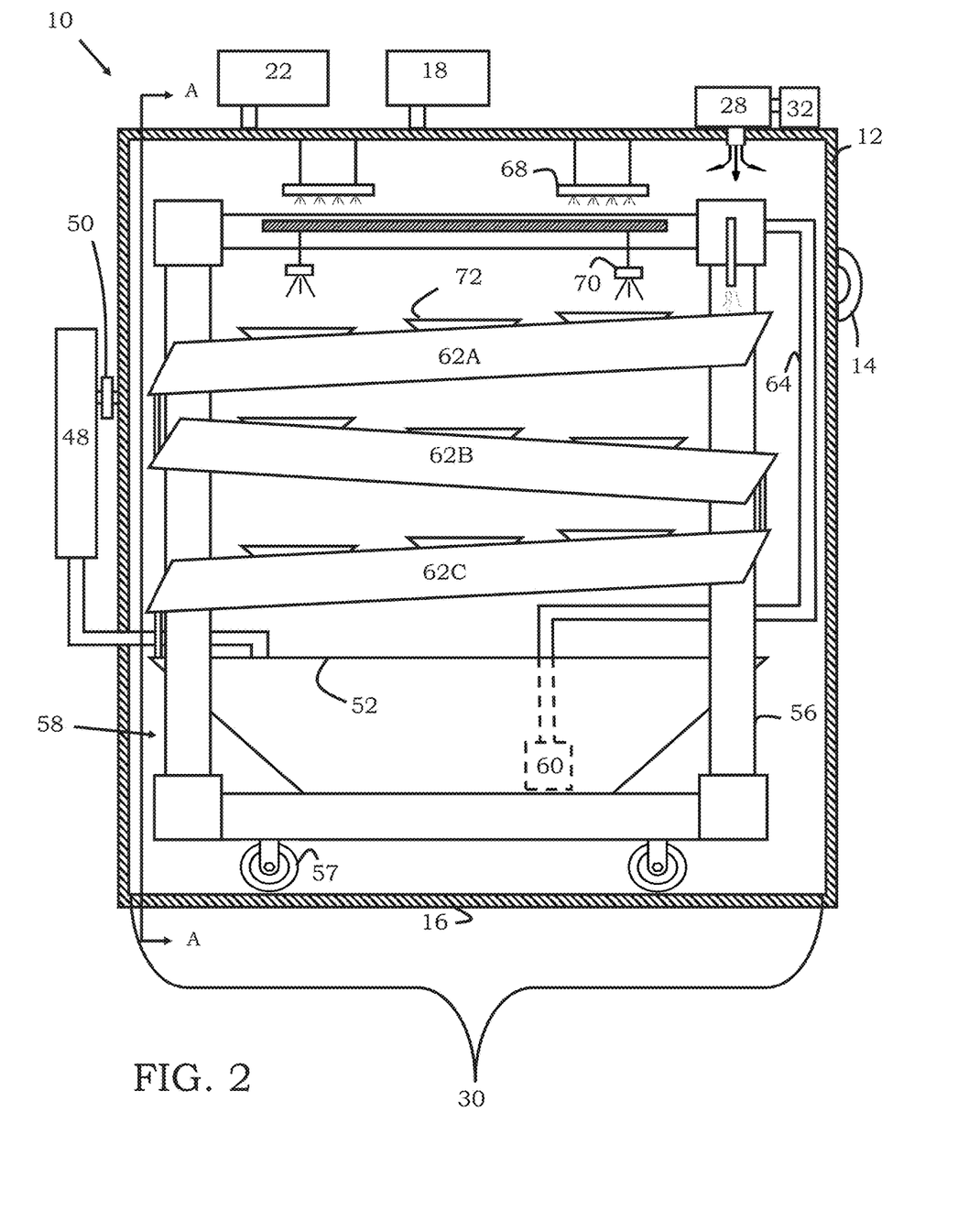
FIG. 2 is an interior view of the osmotic growth chamber of FIG. 1.
Figure 3A:
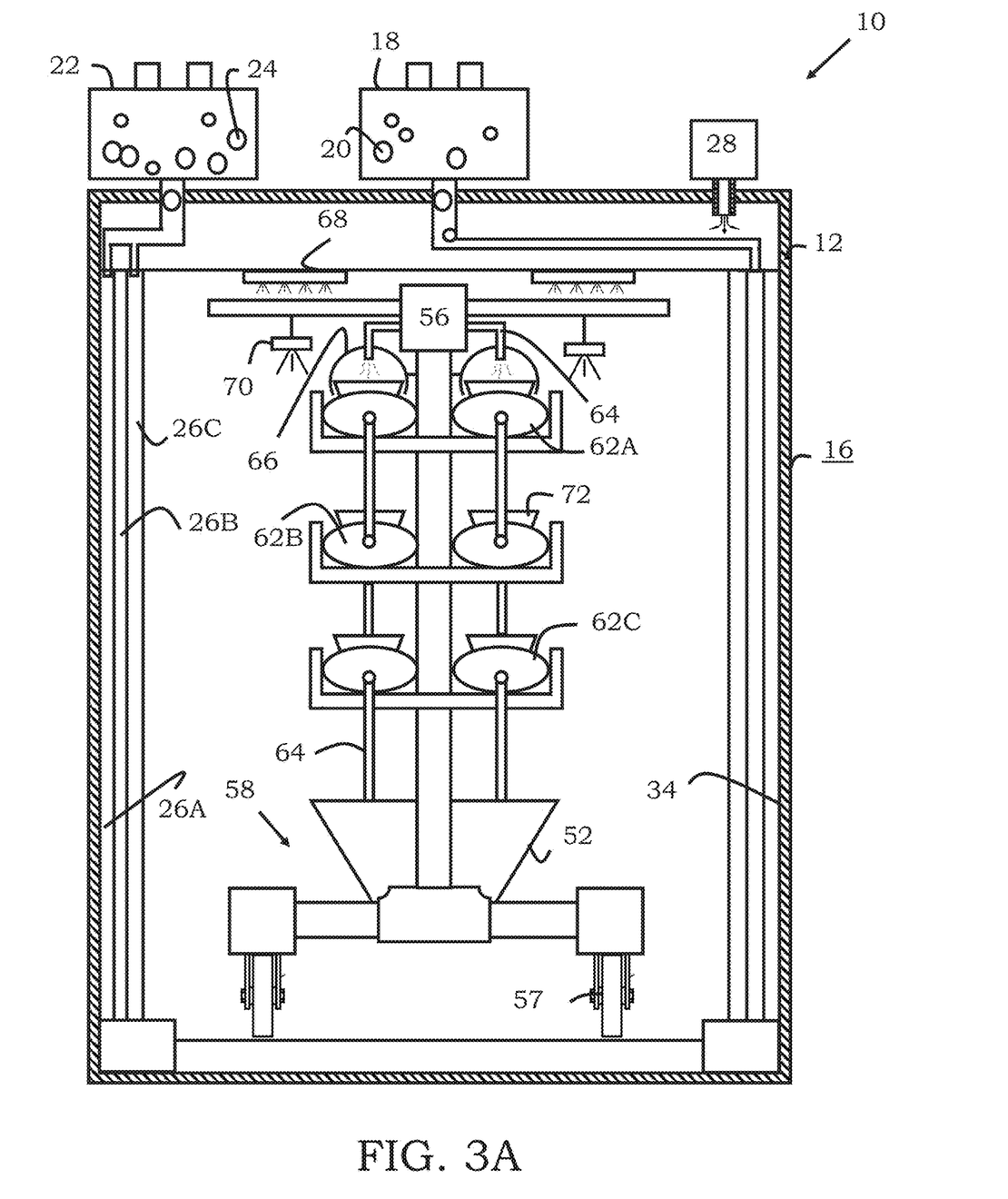
FIG. 3A is a cross-sectional view of the osmotic growth chamber taken along line A-A of FIG. 2.
Figure 3B:
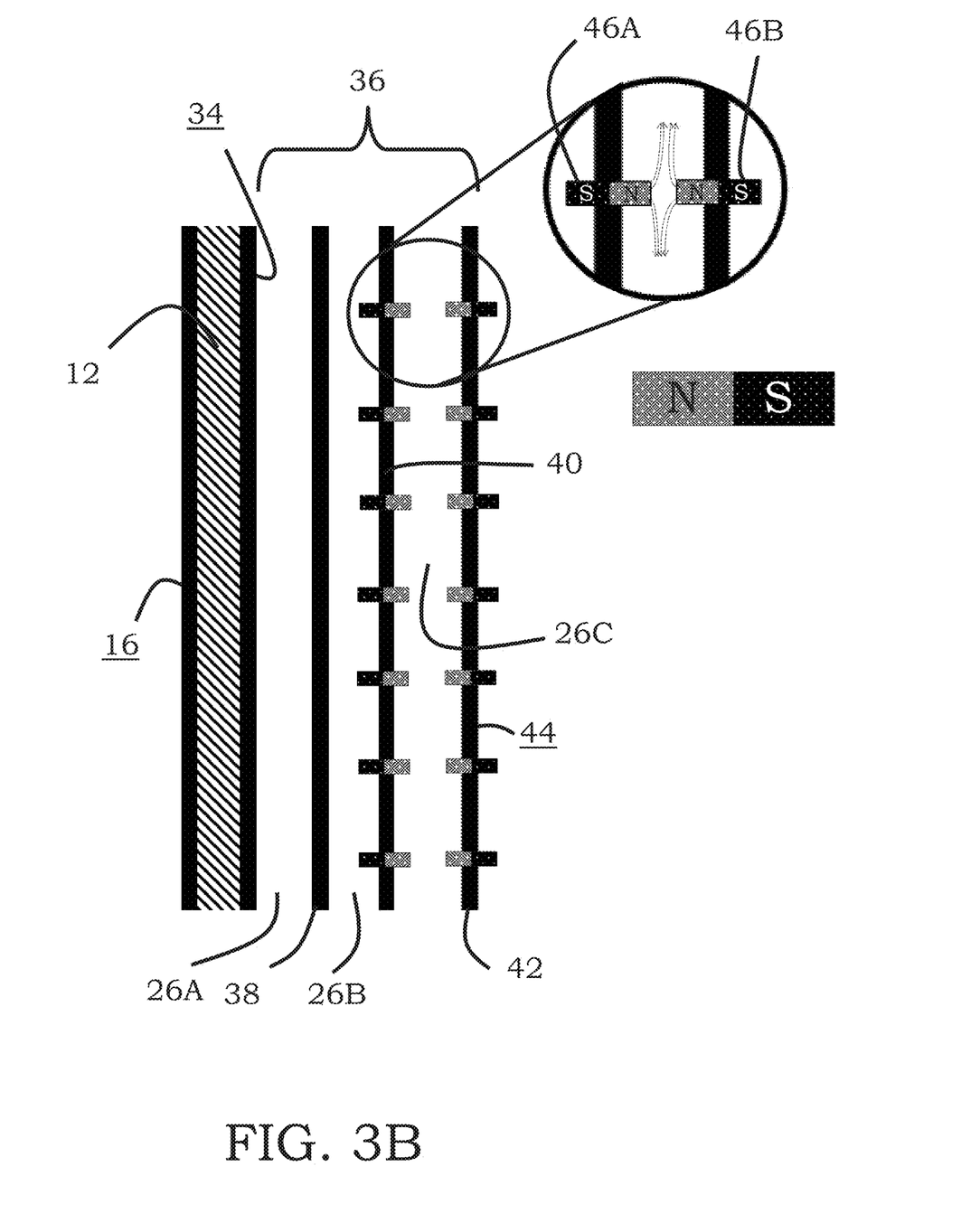
FIG. 3B is a close-up cross-sectional view of the osmotic wall of the osmotic device of FIG. 3A.

As shown in FIGS. 2-3B, body 12 includes internal surface 34 that defines growth chamber 30. Osmotic wall 36 abuts at least a portion of internal surface 34 and includes first partition 26A, second partition 26B, and third partition 26C. In an embodiment, the osmotic wall 36 is initially in a flaccid state before each of the partitions 26 are filled with low 24 and high 20 concentrated urine or saltwater. Second partition 26B is configured to receive second fluid 20 and each of the first partition 26A and third partition 26C are configured to receive first fluid 24.

Osmotic device 10 includes one or more ultra-violet lights 68 disposed within growth chamber 30 to promote photosynthesis, sterilize growth chamber 30, and prevents the formation of biofilms. Osmotic device 10 may include one or more PAR lights 70 configured to emit photosynthetic active radiation to promote photosynthesis.

First semi-permeable membrane 38 is disposed between first partition 26A and second partition 26B. First semi-permeable membrane 38 permits first fluid 24 flowing within first partition 26A to diffuse through first semi-permeable membrane 38 and into second fluid 20 flowing within second partition 26B, thereby increasing the pressure of first fluid 24 within third partition 26C.

Non-permeable membrane 40 is disposed between second partition 26B and third partition 26C to prevent either first fluid 24 or second fluid 20 from diffusing through non-permeable membrane 40. Second semi-permeable membrane 44 is disposed between third partition 26C and growth chamber 30. Osmotic pressure within second partition 26B forces water molecules from low concentration urine or saltwater in third partition 26C to pass through second semi-permeable membrane 44. Water molecules deposited on surface 44 of third partition 26C are evaporated by circulating warm dry gas within growth chamber 30 using air conditioning unit 28. Dry gas in growth chamber 30 will become moist gas due to the evaporation of extracted water molecules on surface 44 of third partition 26C.

In embodiments in which partitions 26 are non-rigid, first set of bar magnets 46A are disposed along non-permeable membrane 40 and a second set of bar magnets 46B are disposed along semi-permeable membrane 44. Each of the first set 46A and the second set 46B of bar magnets are disposed in parallel relation with one another with like poles of first set of bar magnets 46A and the second set of bar magnets 46B oriented towards one another. This orientation of bar magnets 46 creates repelling forces that prevent the non-rigid third partition 26C from collapsing in on itself under pressure from first partition 26A and second partition 26B.

Condenser 48 is in fluidic communication with the environment within growth chamber 30 and converts the water vapor within the air within the environment to liquid water once dry gas becomes saturated with water. Exhaust fan 50 facilitates the movement of air within growth chamber 30 through condenser 48. Once the moist gas passes through condenser 48, the liquid water is deposited into nutrient tank 52, where it is used to supply, nutrient-rich water to one or more agricultural plants.

Figure 4:
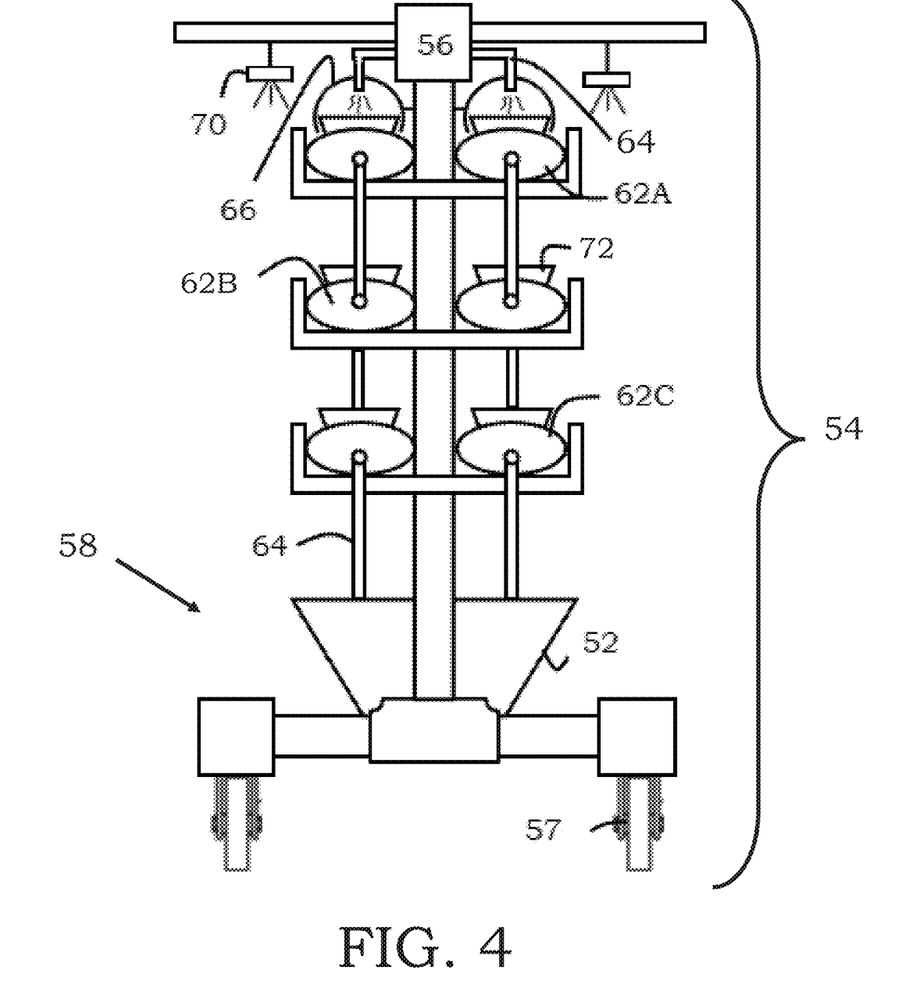
FIG. 4 is a side view of an embodiment of the mobile growing device.

As depicted in FIG. 4, mobile growing device 54 is configured to be removably received within growth chamber 30 and includes frame 56. A plurality of wheels 57 are coupled to first end 58 of frame 56 and permits the movement of frame 56 into and out of osmotic chamber 30. Nutrient tank 52 is also coupled near first end 58 of frame 56 and includes pump 60 disposed within nutrient tank 52. Pump 60 transitions the nutrient-rich fluid from nutrient tank 52 to one or more troughs 62 supported by frame 56 through piping 64.

Troughs 62 are arranged in a cascading pattern such that when the nutrient-rich water is pumped to first trough 62A the nutrient-rich water cascades down into second trough 62B and subsequently into third trough 62C. Excess nutrient-rich water is then re-deposited within the nutrient tank 52 for future use. In an embodiment, troughs 62 may be arranged in an orthogonal relationship to frame 56 and parallel to one another, such that water deposited within the first trough 62A drips through apertures formed within the body of troughs 62 to subsequent troughs 62B and 62C.

Each trough 62 is configured to grow one or more agricultural plants, such as field crops, fruits, vegetables, or herbs. In an embodiment, magnetic done 66 resides above at least one of the agricultural plants 72 and protects agricultural plants 72 from cosmic radiation when mobile growing device 54 is secured within growth chamber 30. Nutrient tank 52 may further include aquatic life such as various species of fish, crustaceans, and mollusks to increase the nutritional value of the nutrient-rich water.

The advantages set forth above, and those made apparent from the foregoing description, are efficiently attained, Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An osmotic device for food and oxygen production, comprising:

an osmotic chamber including a body having an external surface and an internal surface defining a growth chamber disposed to receive one or more agricultural plants therein;

the external surface including a first reservoir containing a first fluid, and a second reservoir containing a second fluid, wherein the first fluid has a lower solute concentration than the second fluid, the external surface further including an air conditioning unit in fluidic communication with the growth chamber, wherein the air conditioning unit conditions the air within the growth chamber to a predetermined temperature;

an osmotic wall abutting at least a portion of the internal surface, the osmotic wall including:

a first partition, a second partition, and a third partition, the second partition residing between the first partition and the third partition, wherein the first and the third partitions are configured to receive the first fluid, and the second partition is configured to receive the second fluid;

a first semi-permeable membrane disposed between the first partition and the second partition, the first semi-permeable configured to permit the first fluid flowing within the first partition to diffuse through the first semi-permeable membrane and into the second fluid flowing within the second partition, thereby increasing the osmotic pressure of the second fluid;

a non-permeable membrane disposed between the second partition and the third partition and configured to prevent either the first fluid or the second fluid from being diffused through the non-permeable membrane;

a second semi-permeable membrane disposed between the third partition and the growth chamber and configured to permit the diffusion of at least a portion the first fluid through the second semi-permeable membrane, such that at least a portion of the first fluid is deposited on a surface of the second semi-permeable membrane;

wherein the air conditioning unit circulates dry air within the growth chamber, such that the portion of the first fluid deposited on the surface of the second semi-permeable membrane is evaporated into the environment within the growth chamber; and a condenser in fluidic communication with the environment within the growth chamber, the condenser configured to convert the water vapor within the air within the environment to liquid water, wherein the liquid water is deposited into a nutrient tank configured to supply a nutrient-rich water to one or more agricultural plants.

2. The osmotic device of claim 1, wherein the external surface further includes an air compressor in fluidic communication with the growth chamber, wherein the air compressor pumps a gas into the growth chamber to pressurize the growth chamber to a predetermined pressure.

3. The osmotic device of claim 1, wherein the osmotic device further includes an ultra-violet light disposed within the chamber, such that ultra-violet light promotes photosynthesis, sanitizes the growth chamber, and prevent the growth of biofilms.

4. The osmotic device of claim 1, wherein the osmotic device further includes a PAR light configured to emit photosynthetic active radiation, such that the PAR light promotes photosynthesis.

5. The osmotic device of claim 1, wherein the first fluid is low concentration urine, and the second fluid is high concentration urine.

6. The osmotic device of claim 1, wherein the first fluid is low concentration saltwater and the second fluid is high concentration saltwater.

7. The osmotic device of claim 1, wherein the osmotic device is assembled within a vehicle capable of space travel, wherein when in a low gravity environment, each of the first and the second reservoirs are pressurized to facilitate the movement of the first and the second fluids.

8. The osmotic device of claim 1, wherein the osmotic device further includes a mobile growing device configured to reside within the growth chamber, wherein the mobile growing device includes:
a frame for supporting one or more troughs arranged in a cascading pattern, each trough configured to grow one or more agricultural plants;
a plurality of wheels coupled to a first end of the frame and configured to permit the movement of the frame in a first direction;
a nutrient tank coupled to the frame having a pump configured to transition the nutrient-rich water from the nutrient tank to the one or more troughs, wherein the water cascades down each of the one or more troughs, such that it is eventually re-deposited back within the nutrient tank.

9. The osmotic device of claim 8, wherein the nutrient tank includes aquatic life for increasing the nutritional benefit of the nutrient-rich water.

10. The osmotic device of claim 8, wherein a magnetic dome resides above at least one of the one or more agricultural plants within one or more troughs, such that the magnetic dome protects the agricultural plants from cosmic radiation when the mobile growing device is secured within the growth chamber.

11. The osmotic device of claim 1, further comprising:
a first set of bar magnets are disposed along a portion of the non-permeable membrane; and
a second set of bar magnets are disposed along the second semi-permeable membrane, each of the bar magnets of the first and the second set of bar magnets are disposed parallel;
wherein like poles of the first set of bar magnets and like poles of the second set of bar magnets are oriented towards one another, such that repelling forces prevent the third partition from collapsing under pressure from the first and the second partitions.

12. An osmotic device for food and oxygen production, comprising:
an osmotic chamber including a body having an external surface and an internal surface defining a growth chamber disposed to receive one or more agricultural plants therein;
the external surface including a first reservoir configured to receive a first fluid, and a second reservoir configured to receive a second fluid, wherein the first fluid has a lower solute concentration than the second fluid, the external surface further including an air conditioning unit in fluidic communication with the growth chamber, wherein the air conditioning unit conditions the air within the growth chamber to a predetermined temperature;
an osmotic wall abutting at least a portion of the internal surface, the osmotic wall including:
a first partition, a second partition, and a third partition, the second partition residing between the first partition and the third partition, wherein the first and the third partitions contains the first fluid, and the second partitions contains the second fluid;
a first semi-permeable membrane disposed between the first partition and the second partition, the first semi-permeable configured to permit the first fluid flowing within the first partition to diffuse through the first semi-permeable membrane and into the second fluid flowing within the second partition, thereby increasing the osmotic pressure of the second fluid;
a non-permeable membrane disposed between the second partition and the third partition and configured to prevent either the first fluid or the second fluid from being diffused through the non-permeable membrane;
a second semi-permeable membrane disposed between the third partition and the growth chamber and configured to permit the diffusion of water from the first fluid through the second semi-permeable membrane, such that the water is deposited on a surface of the second semi-permeable membrane;
wherein the air conditioning unit circulates dry air within the growth chamber, such that the water deposited on the surface of the second semi-permeable membrane is evaporated into the environment within the growth chamber; and
a mobile growing device configured to reside within the growth chamber, wherein the mobile growing device includes:
a frame for supporting one or more troughs arranged in a cascading pattern, each trough configured to grow one or more agricultural plants therein;
a plurality of wheels coupled to a first end of the frame and configured to permit the movement of the frame in a first direction;
a nutrient tank coupled to the frame and configured to receive the liquid water from the condenser, the nutrient tank having a pump adapted to transition the nutrient-rich water from the nutrient tank to the one or more troughs, wherein the water cascades down each of the one or more troughs, such that it is eventually re-deposited back within the nutrient tank,
wherein when the mobile growing device is secured within the growth chamber, one or more agricultural plants may be grown.

13. The osmotic device of claim 12, wherein the external surface further includes an air compressor in fluidic communication with the growth chamber, wherein the air compressor pumps a gas into the growth chamber to pressurize the growth chamber to a predetermined pressure.

14. The osmotic device of claim 12, wherein the osmotic device further includes an ultra-violet light disposed within the chamber, such that ultra-violet light promotes photosynthesis, sanitizes the growth chamber, and prevent the growth of biofilms.

15. The osmotic device of claim 12, wherein the osmotic device further includes a PAR light configured to emit photosynthetic active radiation, such that the PAR light promotes photosynthesis.

16. The osmotic device of claim 12, wherein the first fluid is low concentration urine and the second fluid is high concentration urine.

17. The osmotic device of claim 12, wherein the first fluid is low concentration saltwater and the second fluid is high concentration saltwater.

18. The osmotic device of claim 12, wherein the osmotic device is assembled within a vehicle capable of space travel.

19. The osmotic device of claim 12, further comprising:
a first set of bar magnets are disposed along a portion of the non-permeable membrane; and
a second set of bar magnets are disposed along the second semi-permeable membrane, each of the bar magnets of the first and the second set of bar magnets are disposed parallel;
wherein like poles of the first set of bar magnets and like poles of the second set of bar magnets are oriented towards one another, such that repelling forces prevent the third partition from collapsing under pressure from the first and the second partitions.

20. An osmotic device for food and oxygen production for use in an external environment having high levels of cosmic radiation and low gravity environment, the device comprising:
an osmotic chamber including a body having an external surface and an internal surface defining a growth chamber disposed to receive one or more agricultural plants therein;
the external surface including a first reservoir configured to receive a first fluid, and a second reservoir configured to receive a second fluid, each of the first and the second reservoirs being pressurized, wherein the first fluid has a lower salinity than the second fluid;
the external surface further including an air conditioning unit in fluidic communication with the growth chamber, wherein the air conditioning unit conditions the air within the growth chamber to a predetermined temperature;
an osmotic wall abutting at least a portion of the internal surface, the osmotic wall including:
a first partition, a second partition, and a third partition, the second partition residing between the first partition and the third partition, wherein the first and the third partitions contain the first fluid, and the second partition contains the second fluid;
a first semi-permeable membrane disposed between the first partition and the second partition, the first semi-permeable configured to permit the first fluid flowing within the first partition to diffuse through the first semi-permeable membrane and into the second fluid flowing within the second partition, thereby increasing the osmotic pressure of the second fluid;
a first set of bar magnets coupled along a portion of the first semi-permeable membrane, each bar magnet of the first set of bar magnets disposed parallel to one another;
a non-permeable membrane disposed between the second partition and the third partition and configured to prevent either the first fluid or the second fluid from being diffused through the non-permeable membrane;
a second set of bar magnets coupled along a portion of the semi-permeable membrane, each bar magnet of the second set of bar magnets disposed parallel to one another;
wherein like poles of the first set of bar magnets and like poles of the second set of bar magnets are oriented towards one another, such that repelling forces prevent the third partition from collapsing under pressure from the first and the second partitions;
a second semi-permeable membrane disposed between the third partition and the growth chamber and configured to permit the diffusion of water from the first fluid through the second semi-permeable membrane, such that the water is deposited on a surface of the second semi-permeable membrane;
wherein the air conditioning unit circulates dry air within the growth chamber, such that the water deposited on the surface of the second semi-permeable membrane is evaporated into the environment within the growth chamber; and
a condenser in fluidic communication with the environment within the growth chamber, the condenser configured to convert the water vapor within the air within the environment to liquid water,
wherein the liquid water is deposited into a nutrient tank supplies nutrient rich water to one or more agricultural plants.

* * * * *